(12) United States Patent
Sugure et al.

(10) Patent No.: US 7,987,075 B2
(45) Date of Patent: Jul. 26, 2011

(54) APPARATUS AND METHOD TO DEVELOP MULTI-CORE MICROCOMPUTER-BASED SYSTEMS

(75) Inventors: Yasuo Sugure, West Bloomfield, MI (US); Donald J. McCune, Farmington Hills, MI (US); Sujit Phatak, Farmington Hills, MI (US); George Saikalis, West Bloomfield, MI (US)

(73) Assignee: Hitachi, Ltd, Tokyo (JP)

( * ) Notice: Subject to any disclaimer, the term of this patent is extended or adjusted under 35 U.S.C. 154(b) by 533 days.

(21) Appl. No.: 12/164,178

(22) Filed: Jun. 30, 2008

(65) Prior Publication Data

US 2009/0327944 A1    Dec. 31, 2009

(51) Int. Cl.
*G06F 17/50* (2006.01)
*G06F 3/00* (2006.01)

(52) U.S. Cl. .................. 703/2; 703/22; 703/24; 700/29
(58) Field of Classification Search ................ 703/2, 22, 703/24, 17; 700/29
See application file for complete search history.

(56) References Cited

U.S. PATENT DOCUMENTS

| 6,016,555 A | 1/2000 | Deao et al. |
| 6,065,106 A | 5/2000 | Deao et al. |
| 6,081,885 A | 6/2000 | Deao et al. |
| 6,553,513 B1 | 4/2003 | Swoboda et al. |
| 6,643,803 B1 | 11/2003 | Swoboda et al. |
| 7,778,806 B2 * | 8/2010 | Ishikawa et al. .................. 703/2 |
| 2007/0233286 A1 * | 10/2007 | Ishikawa et al. ................ 700/29 |

* cited by examiner

*Primary Examiner* — Thai Phan
(74) *Attorney, Agent, or Firm* — Gifford, Krass, Sprinkle, Anderson & Citkowski, P.C.

(57) ABSTRACT

A method and apparatus for developing multicore microcomputer-based systems. A dual core controller model having at least one parameter is simulated and, similarly, a plant model having at least one parameter and controlled by the controller model is also simulated. The user interface then has access to the parameters of the controller model and plant model and optionally suspends execution of the controller model and plant model in response to a trigger event. The user interface determines the status of the various controller model parameters for both cores and/or plant model parameters at the time of the trigger without altering the controller model parameters or the plant model parameters. The core parameters for both cores are displayed on a display device.

19 Claims, 4 Drawing Sheets

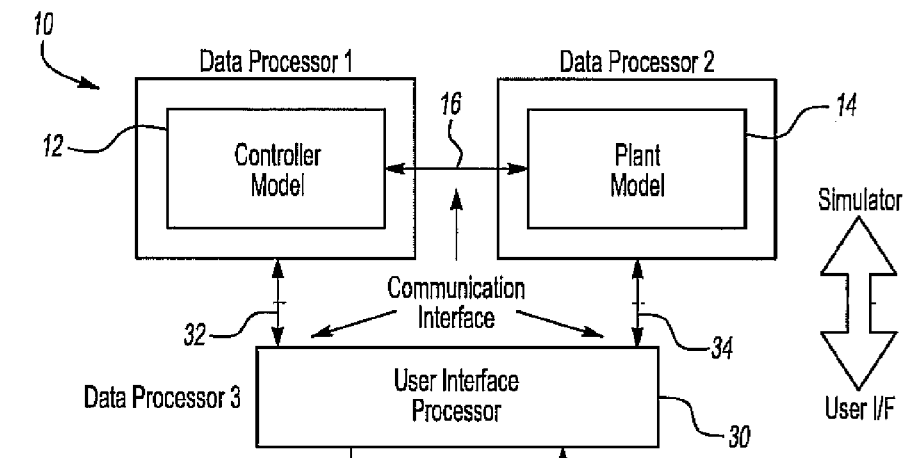
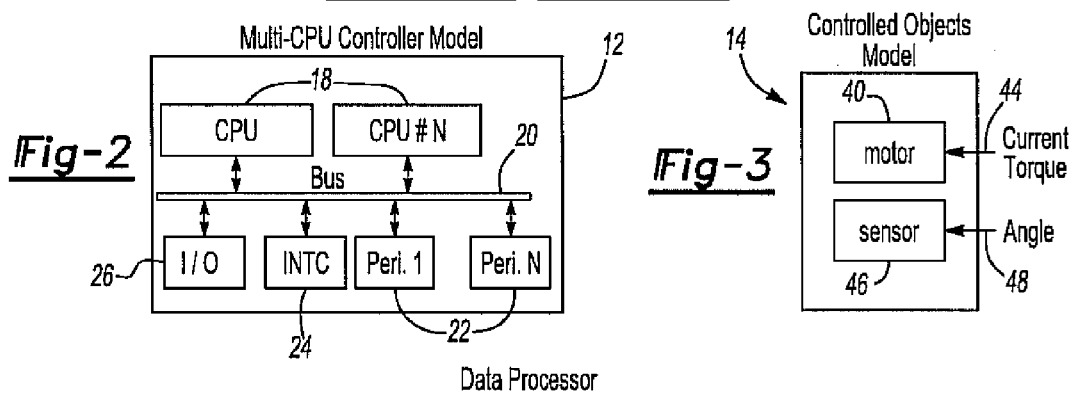
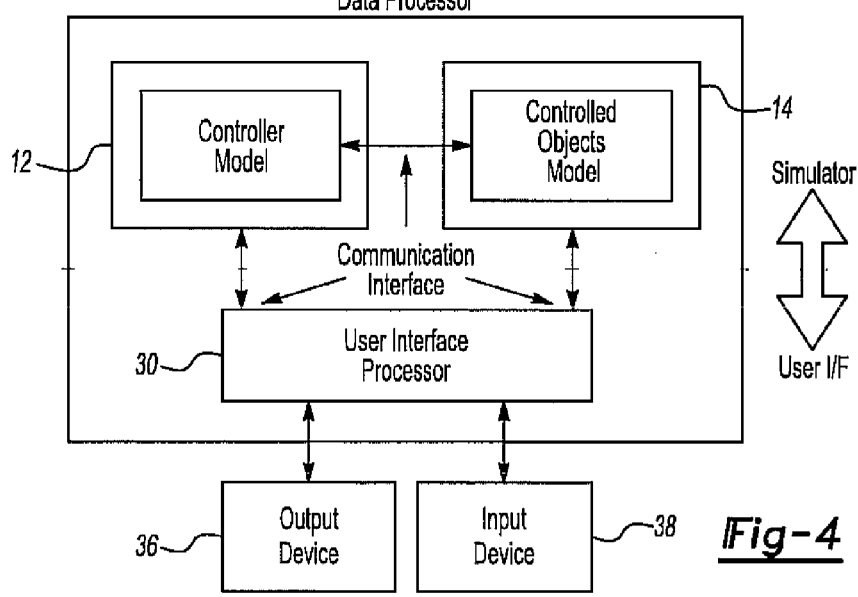

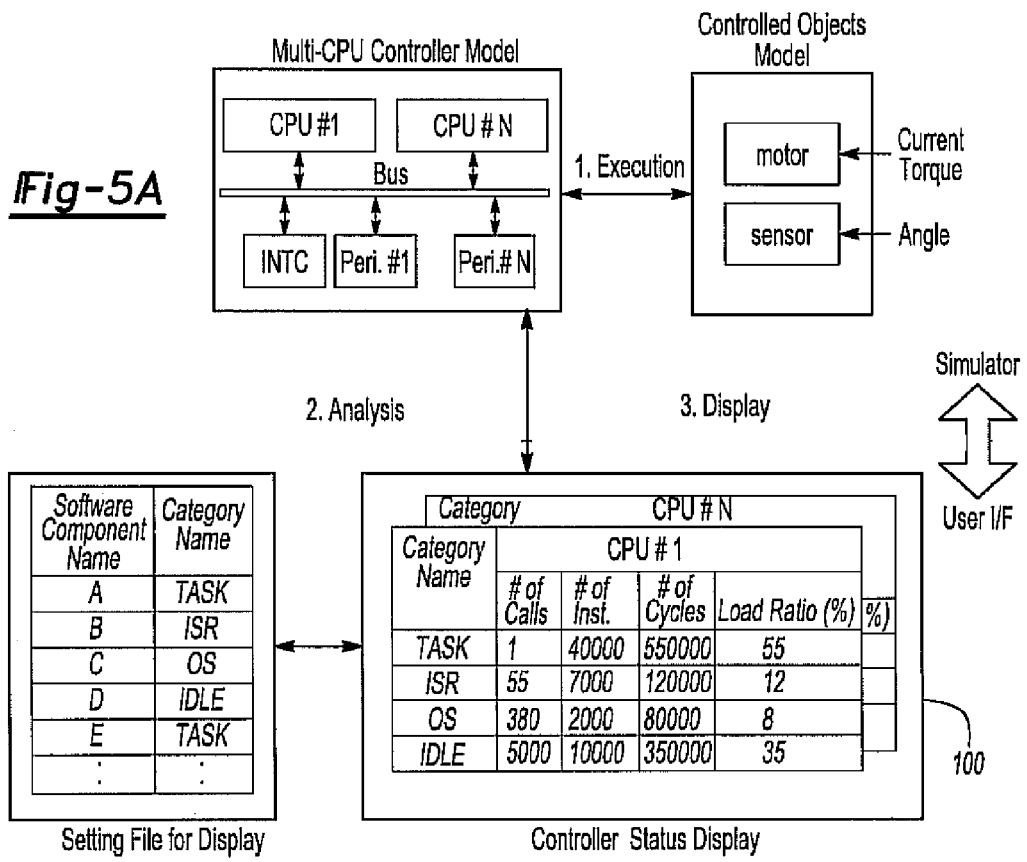
*Fig-5A*
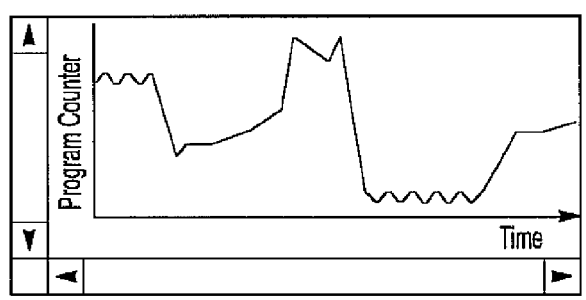
*Fig-5B*
*Fig-5C*
*Fig-5D*

Fig-8

CPU#1

| Category name | # of Calls | # of Inst. | # of cycles | Load ratio[%] |
|---|---|---|---|---|
| TASK | 1 | 40000 | 550000 | 55 |
| ISR | 55 | 7000 | 120000 | 12 |
| OS | 380 | 2000 | 80000 | 8 |
| IDLE | 5000 | 10000 | 350000 | 35 |

CPU#2

| Category name | # of Calls | # of Inst. | # of cycles | Load ratio[%] |
|---|---|---|---|---|
| TASK | 2 | 4000 | 70000 | 7 |
| ISR | 55 | 7000 | 50000 | 5 |
| OS | 380 | 2000 | 80000 | 8 |
| IDLE | 5000 | 90000 | 800000 | 80 |

......

CPU#N

| Category name | # of Calls | # of Inst. | # of cycles | Load ratio[%] |
|---|---|---|---|---|
| TASK | 2 | 90000 | 800000 | 80 |
| ISR | 55 | 7000 | 50000 | 5 |
| OS | 380 | 2000 | 80000 | 8 |
| IDLE | 50 | 1000 | 70000 | 7 |

APPARATUS AND METHOD TO DEVELOP MULTI-CORE MICROCOMPUTER-BASED SYSTEMS

BACKGROUND OF THE INVENTION

I. Field of the Invention

The present invention relates to a method and apparatus for developing multicore microcomputer-based systems.

II. Description of Related Art

There are many applications in which a microcomputer is utilized to control a device oftentimes referred to as the plant. For example, in the automotive industry a microcomputer may be utilized to control the actuation of the engine throttle. In that event, the engine throttle forms the plant.

In order to facilitate the development of such microcomputer-based systems, there have been previously known simulation or development programs which simulate the operation of the system. These previously known programs use real microcontrollers on real plants. Under program control the controller then provides signals to the plant to command the plant to perform the desired operation.

As a part of the development of the microcomputer-based system, it is almost always necessary to debug and fine tune the software executed by the controller. This has been previously accomplished by providing break points within the controller program code. Once a break point is encountered in the controller, the execution of the program halts and enables the programmer to examine the various parameters of both the controller model as well as the plant model. These parameters include the value of internal registers, the status of input and output signals, interrupt status, computed parameter values, etc.

After the desired operation of the system has been obtained, the break point is typically removed. Furthermore, the debugging and fine tuning of the microcomputer and the plant is an iterative process. For example, once a particular section of the controller program has been fine tuned and/or debugged and the break point removed, it is necessary to insert break points in other sections of the program for the controller until the entire program has been debugged and fine tuned to achieve the desired plant operation.

A primary disadvantage of this previously known method for developing controllers and plants is that the insertion of one or more break points within the program for the controller necessarily is intrusive since it requires a change in the programming for the controller. Such intrusive changes in the programming for the controller in turn may result in unwanted and unexpected changes in the operation of either the controller or the plant or both. Such unexpected and unwanted changes in turn require additional debugging and fine tuning of the overall microcomputer-based system.

The previously known microcomputers of the type used to control plants have typically comprised a single central processing unit or CPU. However, modern day microcomputers oftentimes have two or more CPUs or "cores". For example, a dual core microcomputer includes two independent microprocessors which may independently and simultaneously execute their own individual computer programs. While multicore microcomputers are capable of enhanced operational speed over a single core microcomputer, the programming and debugging of multicore microcomputer systems presents unique challenges.

For example, for the proper programming and debugging of multicore microcomputer-based systems, it is highly desirable that the program load, i.e. the number of instructions executed by each core over a given time frame, be substantially the same. Otherwise, the overall efficiency of the multicore microcomputer-based system is compromised.

Previously, there have been known development systems for accurately debugging multicore microprocessor-based systems which accurately reflect the execution of tie multicore microprocessor-based system. As such, the development of multicore microcomputer-based systems was accomplished by using a development system for a single core microcomputer-based system and applying that system to each core in the multicore microcomputer. This, however, led to inaccuracies in the debugging of the computer system due to inherent interaction between the cores of the microcomputer.

SUMMARY OF THE PRESENT INVENTION

The present invention provides both a method and apparatus for developing multicore microcomputer-based systems which overcome the above-mentioned disadvantages of the previously known methods and apparatuses.

In brief, the method of the present invention simulates a multicore controller model having at least one parameter as well as a plant model which also has at least one parameter and is controlled by the controller model. These parameters include the values of registers of both cores in the controller model, the status of inputs and outputs for both the controller model and the plant model, the value of internal variables for each core as well as other factors indicative of the overall condition of the system.

A user interface is implemented which has access to the parameters of both cores of the controller model as well as the plant model. During a simulation, the user interface suspends the execution of the multicore controller model and plant model in response to a trigger event. That trigger event may consist of a condition of either the plant model, the controller model, an allotted time period, or initiated through the user interface.

During the suspension of the execution of the controller model and the plant model, the user interface determines the status of the controller model parameters for both cores and/or the plant model parameters without altering any of the controller model parameters or the plant model parameters. Since the suspension of the program execution of the controller model and plant model occurs unobtrusively, i.e. without changing the controller program by the insertion of break points into the program for the controller model, the introduction of unwanted and unexpected errors that would otherwise be caused by the introduction of such break points is avoided.

The values of the various parameters for both cores of the microcomputer as well as the plant model are stored in memory by the user interface and optionally displayed on a display device. In addition to the value of the various parameters, other values, such as the load value for each core in the microcomputer-based controller, are also saved and/or displayed. In this fashion, the programming of each core of the multicore microcomputer may be implemented to balance the load of each core of the microcomputer so that the load for each core of the microcomputer is substantially the same.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a block diagrammatic view illustrating a first preferred embodiment of the present invention;

FIG. 2 is a block diagrammatic view of a controller model;

FIG. 3 is a block diagrammatic view of a plant model;

FIG. 4 is a view similar to FIG. 1, but illustrating a modification thereof;

FIGS. 5A-5D are exemplary views of output displays of the present invention;

FIG. 8 is a table of the display for each core.

DETAILED DESCRIPTION OF A PREFERRED EMBODIMENT OF THE PRESENT INVENTION

Figure 6:
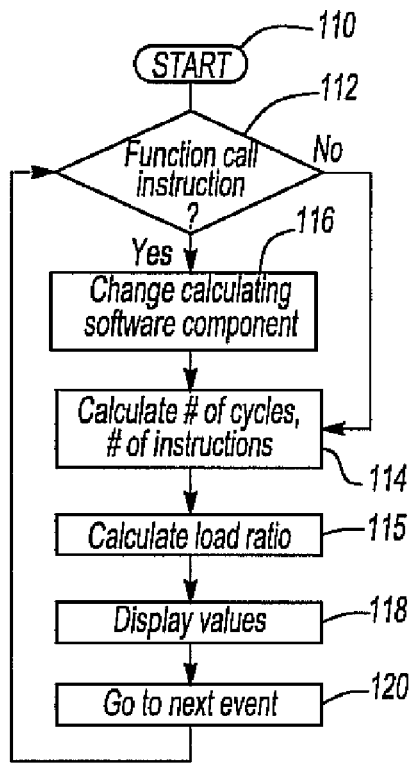
FIG. 6 is a flowchart illustrating the operation of the present invention.

With reference first to FIG. 1, a block diagrammatic view of a preferred embodiment of the apparatus 10 for developing multicore microcomputer or microprocessor-based systems of the present invention is shown. The apparatus 10 includes a simulation of a multicore controller model 12 as well as a plan model 14. The controller model 12 operates under program control and controls the operation of the plant model 14 through one or more simulated control lines 16. Although the plant 14 may be any object that is controlled by a microcomputer, one example of such a plant in the automotive industry would be an electrically controlled throttle valve. In such an application, the controller model 12 controls the operation, i.e. opening and closure, of the throttle valve.

With reference now to FIG. 2, a block diagrammatic view of an exemplary multicore controller model 12 is shown. The controller model 12 includes at least two and up to N number of cores 18 wherein each core 18 comprises a central processing unit or CPU. Each core 18, furthermore, communicates through a bus 20 with one or more peripheral modules 22. The bus 20 may also communicate with an interrupt controller 24 as well as input and output ports 26. In a microcomputer-based system having multiple cores 18, each core 18 may independently execute its own computer program simultaneously with the other cores 18 in the microcomputer-based controller 12. However, all of the cores 18 share the common data bus 20. Consequently, where two or more cores 18 require access to the data bus 20 at the same time, one or more of the cores enter an idle state until the data bus 20 is again free to receive data from the idled core 18.

With reference now to FIG. 3, an exemplary block diagrammatic view of the plant 14 is shown as an electronic throttle control. As such, the plant 14 includes a simulated motor 40 having a parameter on line 44 indicative of the motor current and thus the motor torque. The plant 14 also includes a simulated sensor 46 having a simulated output 48 indicative of the angle of a throttle plate. The values on the lines 44 and 48 constitute the parameters of the plant model 14 which vary in response to commands from the multicore controller 12.

Referring again to FIG. 1, a user interface 30 communicates with the controller model 12 through input/output lines 32. Similarly, the user interface 30 communicates with the plant 14 through input/output lines 34. The user interface 30 also communicates with an output device 36, such as a video monitor, printer or data storage device, to enable the system operator to analyze the results of the overall system simulation between the controller 12 and the plant 14. Similarly, an input device 38, such as a mouse, keyboard and the like, also communicates with the user interface 30 to allow the operator to control the execution of the overall system simulation.

The communication lines 32 and 34 between the user interface 30 and both the controller 12 and plant 14 enable the operator to access the various parameters of both the controller 12 and plant 14 through the user interface. In addition, the communication lines 32 and 34 between the user interface 30 enable the interface contained within the user interface 30 to suspend the execution of the controller model 12 and plant model 14 without varying the value of any of the parameters of either model 12 or 14.

Furthermore, during the suspension of the execution of the simulated controller model 12 and plant model 14, the operator is able to extract the various parameters of each core 18 (FIG. 2) in the controller model 12 as well as the parameters of the plant model 14 without changing the value of those parameters. Consequently, upon resumption of the execution of the simulated execution of the controller program for the various cores 18, the controller model 12 will continue execution without any impact on the simulation of the system by the previous suspension of operation of the controller model 12 and plant model 14.

In the block diagrammatic view illustrated in FIG. 1, the controller model 12 and plant model 14 as well as the user interface 30 are each implemented using a separate processor or computer for both of the models 12 and 14 as well as the interface 30. However, it is not necessary to use separate processors or computers for the models 12 and 14 and interface 30. Instead, as illustrated in FIG. 4, a single processor computer system may be used to implement the multicore controller model 12 as well as the plant model 14 and interface 30.

With reference now to FIG. 5A to 5D, exemplary outputs from the simulation of the overall system are illustrated and displayed on the output device 36 (FIG. 1), such as a video display. For example, a chart 100 may be displayed for each core of the multicore controller model 12 wherein each table 100 includes various parameters as well as calculated values pertinent to that particular core of the controller. For example, the table may include a category name, such as task, idle, OS, etc., indicating the type of executed code executed by one of the computer cores 18. The table 100 may also include the number of times that each category was called as well as the number of instructions in that category, number of cycles consumed and a load ratio for that particular category of computer code. For example, as shown for the first core of the controller 12, the category "task" consumes 55% of the time for the first core, there were 5000 calls to the idle task which consumed 35% of the processing time for the first core, etc. FIG. 5B-5D illustrate other exemplary outputs from the simulation of the overall multicore microprocessor-based system on the output device 36. For example, FIG. 5B is illustrated as a graph showing the value of one parameter of either the controller model 12 or one core of the plant model 14. FIG. 5C represents a table of register values for one of the cores of the controller 12. FIG. 5D illustrates a table of the assembly code currently executed by the core 18 of the controller 12. For example, Address 000000 will store code 0F9A, which will ADD register R0 and R1 in the table shown in FIG. 5C. Address 000002 will store code C003, which will move value of register R1 to memory at the address indicated by R3 in the table. Address 000004 will store code 28DB, which will multiple values of register R1 and R3 in the table. Address 000006 will store code F35E, which will jump to value of register R4 in the table.

It will be understood, of course, that the load ratio in the table 100 is a calculated value while the other information given in the table 100 correlates to various parameters of the controller model. It will also be understood that a different table 100 is generated for each core 18 of the controller 12 and that the multiple tables 100 may be simultaneously displayed if desired. Other types of displays, such as graphs, may also be displayed by the interface 30.

With reference now to FIG. 6, the operation of the present invention will be described for creating the chart 100 for each core 18 of the controller 12. The program begins at step 110 and then proceeds immediately to step 112. At step 112, the program determines whether or not the core is executing a function call instruction. If not, step 112 branches to step 114. If a function call is made at step 112, step 112 proceeds to step 116 in which the function call ID or address is determined. Step 116 then proceeds to step 114.

At step 114, the interface 30 calculates the number of cycles and number of instructions for one core 18 of the controller model. Step 114 then proceeds to step 116.

At step 116, the interface 30 calculates the load ratio for each of the different categories of instructions and function names processed by the core 18 of the controller model 12. Step 116 then proceeds to step 118 where the values are displayed, for example on a display device, or otherwise saved to memory. Step 118 then proceeds to step 120 where the next instruction for the core 18 of the controller model is processed by branching back to step 112 and repeating the foregoing for the next instruction.

It will be understood, of course, that the flowchart illustrated in FIG. 6 is repeated for each core 18 in the controller model 12. In this fashion, the table 100 (FIG. 5) may be generated for each core 18 in the microcomputer controller model 12 and displayed on the display device. This, in turn, enables the programmer to adjust the programming for the various cores 18 within the controller model 12 so that the load ratio for all of the cores 18 are substantially identical. In this fashion, the computing power generated by each core 18 in the controller model 12 will be substantially the same for efficient operation of the controller model.

Figure 7:
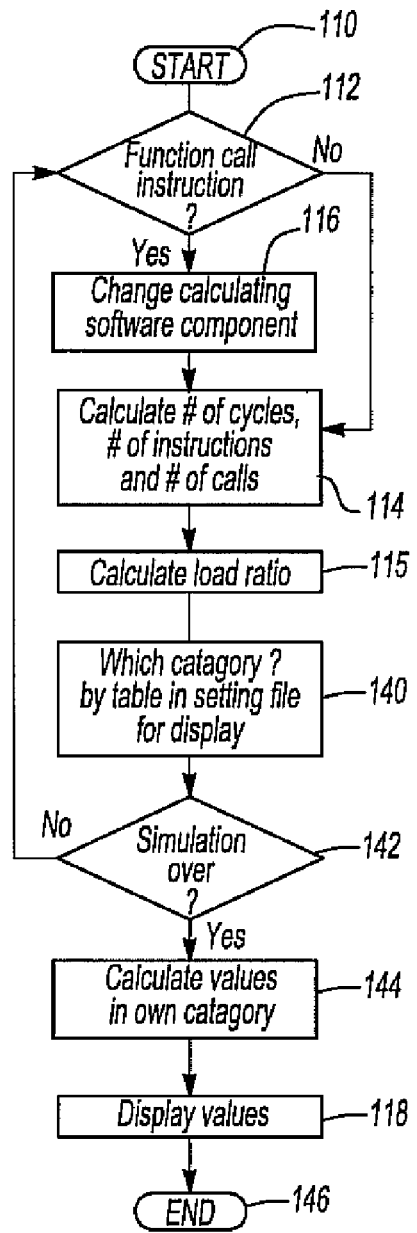
FIG. 7 is a flowchart similar to FIG. 6, but illustrating a modification thereof.

With reference now to FIG. 7, a modification of the flowchart illustrated in FIG. 6 is shown. The flowchart of FIG. 7, however, provides a summary of the various factors and parameters of all of the cores 18 of the controller model 12 at the end of the simulation.

More specifically, after the calculation of the load ratios at step 116, step 116 proceeds to step 140 where the program determines the category name for the instruction. Any conventional means, such as a lookup table, may be utilized to determine the category name. Step 140 then proceeds to step 142.

At step 142, the program determines whether or not the simulation is over. If not, step 142 branches back to step 112 where the above process beginning at step 112 is repeated for the next instruction for each core 18.

Conversely, assuming that the simulation is over, step 142 instead proceeds to step 144 where the total values for the various computed categories, such as load ratio, are determined for each of the cores 18 in the controller model 12. Step 144 then proceeds to step 118 to display the values and then goes to step 146 where the simulation is terminated.

In operation, the simulation takes place under control of the user interface 30. During that simulation, the speed of the simulation may be controlled by the user interface 30, for example, by varying the speed of the clock signal.

The simulation continues until a trigger event is detected. The trigger event may be initiated by the user through the user interface 30 or by the user interface when the user interface encounters a predetermined condition, e.g. the value of a particular register for one of the cores 18. In any event, when the trigger event occurs, the interface 30 suspends the system simulation by halting the clock signal to the controller model 12 and plant model 14. When this occurs, the programs illustrated in FIG. 6 and/or FIG. 7 are executed to display the various parameters of the various cores 18 of the controller model 12 and/or parameters of the plant model 14 on the display device.

It will be understood, of course, that many different types of triggers may be utilized to suspend the operation of the controller and plant simulation and display the various parameters of the controller and plant on the display device. For example, the trigger event may constitute a certain value of one or more registers in either the plant or the controller model. Likewise, an interrupt status of the controller model may form the trigger event. Similarly, various parameters of either the plant and/or controller may form the trigger event.

An important advantage of the present invention is that, once the trigger event occurs, the suspension or halting of the simulation occurs without the necessity of inserting break points into the program code for the controller cores 18 and also without affecting the value of any of the parameters of either the controller or the plant. This, in turn, minimizes the amount of debugging of the final computer code for the cores of the controller 12.

FIG. 8 shows each display of the multicore CPU (CPU#1, #2, . . . , #N) in table 100. In order to select one core of multicore CPU for a new task to be processed, the load ratio of each category (task TASK, interruption routine ISR, operation system OS, idle IDLE) will be calculated for each core. Since load ratio of the idle operation which runs at a low priority so as not to impact programs which run at normal priority, for example an idle task loaded by the OS scheduler only when there is nothing for the computer to do, is calculated based on how the task, interruption routine, and the operation system is occupying the processor, the core having the highest load ratio for idle operation would be the core having the capacity to process a new task not assigned to any of the multicore yet. Multi-CPU processing systems can be classified as either Symmetric MultiProcessing (SMP) or Asymmetric MultiProcessing (AMP). For SMP a single Operating System (OS) manages all CPUs simultaneously, and applications can float to any of them. On the other hand, AMP separately runs OS on each CPU, and each application is locked to a specific CPU. In this embodiment since SMP is non-deterministic, which critical software functions cannot be guaranteed to execute with a guaranteed response time, and not suitable for systems used in automotive industry requiring a guaranteed response time, executing information of each core is calculated to use the multicore as AMP. Developers would need to determine to assign some tasks to fixed processor resources in order to make maximum use of performance at the design stage. Though usage of AMP requires calculation of executing information of each core, it is easy to port legacy code, and would guarantee full control of the software's utilization of system resources such as memory, and interrupts. In this embodiment executing information on each CPU, such as number of cycle, and instruction, calls, are obtained before assigning some tasks on each CPU, so that idle load ratio for each core could be calculated and compared. This allows to get the new task assigned to the core having the highest idle load ratio. So in FIG. 8 CPU#2 would be selected. The selection could be done by the user selecting from the display or automatically if the program setting the rule is stored on one of the multicores.

From the foregoing, it can be seen that the present invention provides both an apparatus and a method for developing multicore microcomputer-based systems and which is capable of unobtrusively monitoring the status of various parameters of all of the cores of the microcomputer-based controller as well as the plant during the simulation. Furthermore, various calculated values, such as the load of the various software modules for each core, are also displayed to the programmer to enable the programmer to adjust the programming of the cores in the controller 12 for optimum efficiency of the controller 12.

Having described our invention, however, many modifications thereto will become apparent to those skilled in the art to which it pertains without deviation from the spirit of the invention as defined by the scope of the appended claims.

We claim:

1. Method for simulating multicore microcomputer-based systems comprising the steps of:
   simulating a microcomputer-based controller model for each core, each core of a plurality of cores having at least one parameter,
   simulating a plant model having at least one parameter and controlled by said controller model,
   simulating an interface processor having access to parameters for each core of the controller model and plant model,
   suspending the execution of said cores of the controller model and plant model through said user interface in response to a trigger event,
   determining the status of controller model parameter(s) for each core and/or plant model parameter(s) through said interface processor during said suspending step without altering said controller model parameter(s) or said plant model parameter(s),
   identifying the core of said plurality of cores having the highest load ratio for an idle operation, and
   assigning the next unassigned software task to the identified core having the highest load ratio for the idle operation.

2. The invention as defined in claim 1 wherein said trigger event comprises a condition of a selected parameter(s) of said plant model.

3. The invention as defined in claim 1 wherein said trigger event comprises a condition of a selected output parameter(s) of a selected core of said controller model.

4. The invention as defined in claim 1 wherein said trigger event comprises a condition of a selected internal parameter(s) of said controller model.

5. The invention as defined in claim 1 wherein said trigger event comprises a condition set in said user interface.

6. The invention as defined in claim 1 and further comprising the step of controlling the speed of execution of said cores of said microcontroller model and said plant model through said user interface.

7. The invention as defined in claim 1 and comprising the step of displaying said controller model parameter(s) for each core and/or plant model parameter(s).

8. The invention as defined in claim 1 and comprising the step of calculating a value and displaying said calculated value on a display device.

9. The invention as defined in claim 8 wherein said calculated value comprises the load of at least one of the cores.

10. The invention as defined in claim 8 wherein said calculated value comprises the load of software components of the cores.

11. The invention as defined in claim 10 wherein the software components include a idle component related to idle operation and said load of the idle component is compared in case of designating a new task.

12. Apparatus for simulating multicore microcomputer-based systems comprising:
    means for simulating a microcomputer-based controller model for each core of a plurality of cores and having at least one parameter,
    means for simulating a plant model having at least one parameter and controlled by said controller model,
    means for simulating an interface processor having access to parameters of each core of the controller model and plant model,
    means for suspending the execution of each core of the controller model and plant model through said user interface in response to a trigger event,
    means for determining the status of controller model parameter(s) for each core and/or plant model parameter(s) through said interface processor during said suspending step without altering said controller model parameter(s) or said plant model parameter(s),
    means for determining the core having the highest load ratio during an idle operation, and
    means for assigning the next unassigned software task to said core which has the highest load ratio during the idle operation.

13. The invention as defined in claim 12 wherein said trigger event comprises a condition of a selected parameter(s) of said plant model.

14. The invention as defined in claim 12 wherein said trigger event comprises a condition of a selected output parameter(s) of said controller model.

15. The invention as defined in claim 12 wherein said trigger event comprises a condition of a selected internal parameter(s) of said controller model.

16. The invention as defined in claim 12 and comprising means in said user interface for setting said trigger.

17. The invention as defined in claim 12 and comprising means for displaying said controller model parameter(s) for each core and/or plant model parameter(s).

18. The invention as defined in claim 12 and comprising means for calculating a value and means for displaying said calculated value on a display device.

19. The invention as defined in claim 16 wherein said calculated value comprises the load of at least one of the cores.

* * * * *